US009669872B2

(12) United States Patent
Rebhan et al.

(10) Patent No.: US 9,669,872 B2
(45) Date of Patent: Jun. 6, 2017

(54) METHOD AND SYSTEM FOR PREDICTIVE LANE CHANGE ASSISTANCE, PROGRAM SOFTWARE PRODUCT AND VEHICLE

(71) Applicant: HONDA RESEARCH INSTITUTE EUROPE GMBH, Offenbach/Main (DE)

(72) Inventors: Sven Rebhan, Offenbach (DE); Jens Schmüdderich, Offenbach (DE); Marcus Kleinehagenbrock, Offenbach (DE); Thomas Weißwange, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/687,139

(22) Filed: Apr. 15, 2015

(65) Prior Publication Data
US 2015/0321699 A1 Nov. 12, 2015

(30) Foreign Application Priority Data

May 7, 2014 (EP) .................................... 14167367

(51) Int. Cl.
*B60Q 9/00* (2006.01)
*B60W 30/14* (2006.01)
(Continued)

(52) U.S. Cl.
CPC ........... *B62D 15/0255* (2013.01); *B60Q 9/00* (2013.01); *B60W 30/14* (2013.01); *B60W 30/16* (2013.01); *B62D 15/026* (2013.01); *G01S 19/13* (2013.01); *G08G 1/167* (2013.01)

(58) Field of Classification Search
CPC . B62D 15/0255; B62D 15/026; B60W 30/16; B60W 30/14; G08G 1/167; B60Q 9/00; G01S 19/13
See application file for complete search history.

(56) References Cited

U.S. PATENT DOCUMENTS

| 5,521,579 A | 5/1996 | Bernhard |
| 2004/0107030 A1* | 6/2004 | Nishira ................. B60W 40/02 701/36 |

(Continued)

FOREIGN PATENT DOCUMENTS

| DE | 10 2005 050 662 A1 | 4/2007 |
| DE | 10 2006 040 332 A1 | 3/2008 |

(Continued)

OTHER PUBLICATIONS

European Search Report dated Sep. 12, 2014 corresponding to European Patent Application No. 14167367.3.

*Primary Examiner* — Michael J Zanelli
(74) *Attorney, Agent, or Firm* — Squire Patton Boggs (US) LLP (57) ABSTRACT

A system and method assists a driver of a host vehicle in potential lane change situations. The method includes producing sensor data by a sensor physically sensing the environment of the host vehicle, predicting future movement behavior of at least one sensed vehicle, and determining whether a gap on a neighboring lane of the host vehicle exists. If the neighboring lane of the host vehicle would fit better for the predicted future movement behavior, a recommendation information signal is generated. Feasibility is determined by combining the determination result of the existence of a gap and the predicted future behavior. A notification for the host vehicle is output or, if lane change is feasible, signals for performing autonomous lane change (Continued)

based upon the recommendation information signal by the host vehicle are output.

9 Claims, 5 Drawing Sheets (51) Int. Cl.
*B62D 15/02* (2006.01)
*G01S 19/13* (2010.01)
*G08G 1/16* (2006.01)
*B60W 30/16* (2012.01)

(56) References Cited

U.S. PATENT DOCUMENTS

| | | |
|---|---|---|
| 2004/0193374 A1 | 9/2004 | Hac et al. |
| 2005/0187713 A1* | 8/2005 | Yamamura ............. G08G 1/167 701/301 |
| 2007/0150134 A1 | 6/2007 | Yamamoto |
| 2008/0201050 A1* | 8/2008 | Placke ................... B60W 10/06 701/70 |
| 2009/0088925 A1* | 4/2009 | Sugawara ............. B60W 30/12 701/41 |
| 2011/0054793 A1 | 3/2011 | Harada et al. |
| 2013/0054106 A1* | 2/2013 | Schmudderich .. B60W 30/0956 701/96 |
| 2013/0151145 A1* | 6/2013 | Ishikawa ............ G01C 21/3667 701/428 |
| 2014/0067250 A1* | 3/2014 | Bone ...................... G08G 1/167 701/301 |
| 2015/0194055 A1* | 7/2015 | Maass ................... B60W 50/14 340/905 |

FOREIGN PATENT DOCUMENTS

| | | |
|---|---|---|
| EP | 2 562 060 A1 | 2/2013 |
| WO | WO2006/122867 A1 * | 11/2006 |

* cited by examiner

Fig.1

| prediction status / determination result for gap | no cut-in is predicted | cut-in is predicted |
|---|---|---|
| lane on left of ego vehicle which is free | no indication or warning by iLCA | recommended lane change to left |
| lane on left of ego vehicle which is occupied | standard LCDAS indication or warning by iLCA | Indicate or warn that a lane change to the left is not possible or prevent lane change |

METHOD AND SYSTEM FOR PREDICTIVE LANE CHANGE ASSISTANCE, PROGRAM SOFTWARE PRODUCT AND VEHICLE

BACKGROUND

Field

The invention relates to a method and system for predictive lane change assistance, a program software product and a vehicle equipped with such system.

Description of the Related Art

Over the last years, driver assistance systems have been developed which assist a driver in a plurality of ways. At first, simple cruise control was introduced that maintains a constant speed of a vehicle by automatically adapting the output of the engine of the vehicle. The system has to be switched on and off manually and thus, only had a limited capability of increasing the comfort for a driver. In the next step, adaptive cruise control was developed and here in fact for the first time it seems that the environment of the vehicle equipped with such a system was taken into consideration for actively adapting the speed. This was achieved by sensing the distance to a preceding vehicle and by a set speed as target speed. Thus, the vehicle is actively decelerated in case that the preceding vehicle brakes and afterwards is autonomously accelerated again with the target speed as maximum. In today's traffic environment which is strongly affected by crowded roads, this was a significant improvement of the comfort of the driver.

This density of traffic on the other hand needs the full concentration of a driver. It is obvious that sometimes a lack of concentration causes situations which on the one side are dangerous and on the other side have a negative influence on traffic flow. In order to assist the driver, inform him or warn him for example, a lane departure warning system has been developed and also a blind spot detection system. Such systems are particularly advantageous when driving on roads that have a plurality of lanes. But again, the capability of the systems is pretty limited. In particular, the blind spot warning system only warns the driver in case that an intended lane change can be recognized. Although such blind spot warning systems have been further developed to lane change assist information systems it is still the driver's behavior that triggers the system to become active. This means that only if the driver has correctly interpreted a traffic situation and then decides to make a lane change, the assistance of the system will become effective. A lack of concentration when evaluating the traffic situation or a lack of experience of a driver which also results in a possible misinterpretation of the traffic situation can thus not trigger the system at all.

In particular, existing systems are not capable of positively recommending a lane change to a driver, because the function of the system is limited to a reaction of an intended lane change of the driver.

SUMMARY

It is thus an object of the present invention to provide an intelligent lane selection assistance which is capable of autonomously analyzing a traffic situation in order to assist the vehicle driver.

This object is achieved by the method, the system, the program and the vehicle according to the independent claims.

According to the invention, sensor data is produced by at least one sensor which physically senses the environment of the host vehicle. Such sensing means is for example a radar or a lidar sensor or even an image capturing unit so that the environment of the host vehicle can be analyzed by using image processing. Sensing the environment of the host vehicle gives the opportunity to predict the future movement behavior of one or more other vehicles. Examples for such predicted behavior will be explained later on in detail. Such vehicle which is sensed by at least one sensor and for which a future movement behavior is predicted is called target vehicle. In addition to the predicted future movement behavior of such target vehicle, it is determined, whether a gap on a neighboring lane of the host vehicle exists. Contrary to the presently known systems, the information about the future movement behavior and the existence of a gap on a neighboring lane of the host vehicle are evaluated. It is determined if the neighboring lane would fit better to the driving situation in the future arising from the predicted future behavior. It is to be noted that if "the neighboring lane fits better" is determined based on the assumption that the neighboring lane is free. A lane is considered "free" when it has a sufficiently large gap.

The outcome of the combination of the predicted future movement behavior and the determination result regarding the gap is the basis for generation of a recommendation information signal. This recommendation information signal contains information regarding feasibility of a lane change of the host vehicle to the better fitting lane. On the basis of the recommendation information, a notification for the host vehicle driver is output, which can indicate for example a positive recommendation to change the lane or information about an occupied lane or a warning that a lane change is currently not possible. Furthermore, as an alternative or in addition, it is possible to generate signals for performing an autonomous lane change on the basis of the recommendation information signal if a lane change is recommendable. For performing such autonomous lane change, the signals then would be transmitted to controls of the vehicle such as a brake system, an engine control system or a power steering for example.

One advantage of the invention is that a notification that a lane change seems to be reasonable can be made already at a point in time where the driver himself does not even recognize that such lane change possibly avoids that he has to adapt his traveling speed. An example for such a situation is when the host vehicle is on the middle lane of a three-lane road and the target vehicle cuts in. When the target vehicle which is cutting in is slower than the host vehicle two basic reactions are possible in general. First, it would be possible to slow down the host vehicle and drive straight and second, while maintaining the speed, a lane change to the other neighboring lane could be performed. Of course, it is only possible to perform such lane change if there is a sufficiently large gap on this neighboring lane. The invention allows that on the one hand it is not only recognized that there is a gap or there is no gap when the driver himself already decided that a lane change should be performed, but even at an earlier stage where the system is capable of predicting a lane change of the target vehicle, a recommendation to perform such lane change can be given.

On the other hand, since the invention combines the predicted future movement behavior with the determination about existence of a gap, it is also possible that although the predicted future movement behavior would induce a lane change, the driver is warned about such lane change, because currently there is no gap. This can prevent that a driver performs a lane change, because he recognizes the cut-in but does not see a vehicle in the blind spot.

Another advantage is in particular for the development of autonomous driving systems that the reaction of the system can be performed at an earlier stage and thus the action itself like performing a lane change or adapting the speed when necessary can be performed more smoothly.

Advantageous configurations of the present invention are claimed in the sub-claims.

In particular, it is possible and advantageous that not only a notification of the host vehicle driver regarding the lane change is given or an autonomous lane change is performed, but also the vehicle's speed is adapted autonomously. With such an adaption of the speed, a proper reaction, if the cutting-in vehicle reduced the safety distance of the host vehicle significantly, can be achieved. Such reduction of speed gives additional time for performing the lane change without the need of sharply steering the vehicle to the new lane. In case that the combination of the predicted future movement behavior and the determination of the existence of the gap reveals that at the moment a lane change is not possible, but the safety distance between the cutting in vehicle and the host vehicle is significantly reduced, it is also possible to start braking or to initiate an emergency braking if necessary. The inventive system then reacts like a conventional adaptive cruise control.

In another advantageous embodiment, it is possible not only to determine the existence of a gap on the better-fitting neighboring lane for the time at which the cutting in of the target vehicle is determined, but to predict for the future the existence of such gap. This may be the case if the lane which potentially fits better is a lane where the vehicles travel at higher speed for example and a vehicle which is approaching fast from behind on this lane will have passed the host vehicle in the near future. In such a case, it is advantageous to reduce the speed of the host vehicle autonomously thereby enabling to change the lane into the gap after the overtaking car has completely passed.

One advantageous way is outputting a symbol as a notification. Such a symbol may be an easy to recognize symbol which either recommends the lane change or which clearly indicates that a lane change is not feasible at the moment. The symbol may be displayed on the dashboard of the vehicle or in the area of a mirror or the side window. Of course, any place where driver information is presented is suitable for displaying such symbol. This includes particularly the windscreen in case a head-up-display is used for driver information.

In addition or alternatively, the notification may be output as an acoustic and/or haptic signal. An acoustic symbol could be any kind acoustic warning either a spoken message or a simple beep or a combination thereof. The recommendation to perform a lane change could be for example a spoken message whereas the warning that a lane change cannot be performed at the moment could be indicated by a beep which usually is recognized by a driver as being a warning. A haptic signal could be for example a vibration of the steering wheel in order to give a warning to the driver or, by using the power steering of the vehicle, a force that is generated so that turning the steering wheel in one direction is easier than in the other. The driver will recognize this and follow the suggestion intuitively. By such force on the steering wheel it is furthermore particularly easy to recommend a lane change by a force to one side or to warn by a force to the other side, because both notifications use the same systematic.

As it has already been explained earlier it is especially advantageous if in case it is predicted for a target vehicle that the vehicle will cut-in and that a neighboring lane of the host vehicle is free and thus this lane would fit better than the current lane, a recommendation to change the lane is made to the driver. But the system has not only advantages if another traffic participant intends to change to the lane of the host vehicle, but also if on a multiple-lane road the lane directly adjacent to the current lane of the host vehicle becomes free because another traffic participant changes lane to a lane further away. If such lane change is predicted for the target vehicle and the directly adjacent lane of the host vehicle thereby becomes free, also a lane change can be recommended to the driver. Such procedure is particularly advantageous in countries where a prioritization of the lanes exists.

In order to avoid recommendations that make no sense in traffic situations it is a further advantage that it is determined that a neighboring lane of the current lane of the host vehicle fits better in case that the successor is approaching on the same lane as the host vehicle and no indication for an intended lane change of the successor can be recognized. In such a case, the neighboring lane would fit better to the host vehicle.

According to another aspect, it is determined that the neighboring lane of the current lane of the host vehicle fits better generally in case that the neighboring lane is prioritized or in case a required adaptation of the speed of the host vehicle would be smaller on this neighboring lane than on the current lane. The latter is particularly useful to generally enhance the traffic, because if a plurality of the vehicles are equipped with the invention, it would always be that the speed adaptation is performed by the vehicle which needs the smallest change in speed.

For computing the sensor data thereby predicting future movement behavior and determining the existence of a gap and thereafter generating the recommendation information by a combination of the predicted behavior and the determination result, the driver assistance system comprises a computing unit.

Furthermore, the assistance system advantageously comprises an adaptive cruise control unit so that some of the sensed data may be computed commonly both for the adaptive cruise control unit and the lane change assistance system and/or the functionality of such adaptive cruise control to adapt the speed of the host vehicle are used. Furthermore, in order to avoid any misleading recommendations it is useful that the system is equipped with a lane detection unit so that clearly defined lanes are the basis for assigning traffic objects including the host vehicle itself to one of the detected lanes. Such system can be based for example on image processing which analyzes lane markings.

BRIEF DESCRIPTION OF THE DRAWINGS

Hereinafter aspects and features of the invention will be described in detail with reference to the annexed drawings. In the drawings.

DETAILED DESCRIPTION

Figure 1:
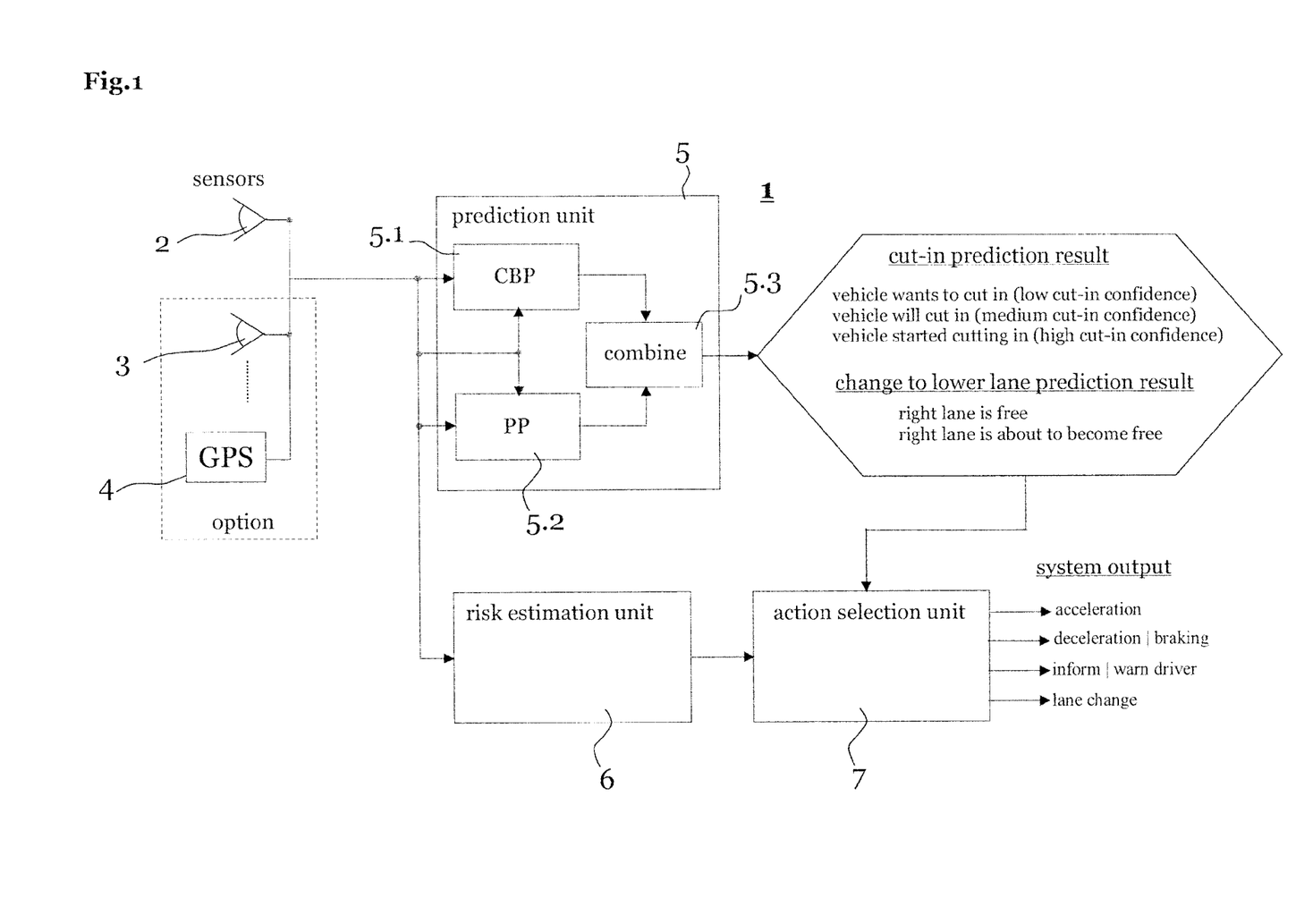
FIG. 1 shows an overview over the system and method for assisting a driver of a host vehicle for selecting a road lane.

FIG. 1 gives an overview over the inventive system and the method for performing lane selection assistance will be described regarding its general steps. The system 1 is mounted on a host vehicle and is preferably integrated with existing systems of such host vehicle. In particular, controls such as an accelerator or motor management ECU, power steering or a braking system may be used by the system 1.

The system 1 comprises at least one sensor 2 which is capable of physically sensing the environment of the host vehicle. Such sensor 2 produces data that allow analyzing a relative position and orientation of a target vehicle or a plurality of target vehicles relative to the host vehicle. In case of radar sensors the result of the sensing directly delivers information about a current speed of the sensed object. Alternatively for other sensor types the temporal resolution of sensor 2 allows determining the current speed of the sensed target object(s).

Since it is difficult to have only one sensor 2 which is capable of sensing the entire environment of the host vehicle and thereby covering an area on both sides of the host vehicle as well as the forward direction and the rearward direction, it is preferred to have a plurality of sensors. As it is indicated in FIG. 1, the plurality of sensors may but does not need to be of the same type. In the illustrated embodiment in addition to sensor 2 a second sensor 3 is present as well as a GPS system 4. Such GPS system 4 can be used to link the host vehicle's current position to map data. The system may also comprise further means for obtaining information, for example, a car-to-car communication system (C2C) which is not separately illustrated in FIG. 1.

If the host vehicle is already equipped with sensors that are needed for other assistance or comfort functions these sensors may be used in common.

The sensor data which are produced by the one or more sensors 2, 3, 4, . . . are transmitted to a prediction unit 5 and a risk estimation unit 6. The prediction unit 5 is configured to produce a prediction result on the basis of the sensor data and may be the same prediction unit that is used for an intelligent adaptive cruise control. The prediction describes a future movement behavior of a target object and can combine a context-based prediction result with a physical prediction result which will be described in greater detail later. In order to perform the context-based prediction, a context-based prediction section 5.1 is provided. Additionally, a physical prediction section 5.2 is provided to calculate a physical prediction result. The results of the prediction sections 5.1 and 5.2 then can be combined in a combination section 5.3. After combining the results of the prediction sections 5.1 and 5.2 the prediction result is output and transmitted in form of a prediction signal to an action selection unit 7. It is to be noted that the output of the prediction unit also can directly correspond to the result of the physical prediction or the context based prediction in case the respective other prediction result does not contribute.

This output signal comprises information about the result of the prediction of the prediction unit 5. As examples there are mentioned in FIG. 1 three different prediction results having different confidence levels that the target vehicle cuts in:

1. A vehicle wants to cut in which is the result when there is a low confidence that the vehicle eventually will change lane and thereby cut in.
2. The target vehicle will cut in for sure, but the cut-in has not started yet. The probability can already be estimated to be significantly higher than in 1.
3. The vehicle already started cutting in. This is the result when there is a very high confidence that the vehicle will cut in.

The first two prediction results can be derived directly from the context-based prediction and are not confirmed by the physical prediction which thus does not contribute. In particular, the first result that the vehicle wants to cut in may be determined in a very early stage of the entire method. As a consequence, when this information is used for further processing, a relatively large effect of saving time can be achieved. On the other hand, there is of course a higher risk that the situation is evaluated wrongly and in the end no cut-in will be performed.

The third prediction result at least needs the verification by the physical prediction and will be output when for example the target vehicle already leaves its lane so that it can be directly recognized that the process of entering the lane of the host vehicle has started.

The different levels of confidence can be used to provide an escalation for the driver notification: low confidence leads to a simple information, higher confidence to a warning and highest confidence to an autonomous action.

Another prediction result regards a lane change of the target vehicle from a lane directly adjacent to the current lane of the host vehicle to the lane next to the adjacent lane. Thus, there are at least two possible results:

1. The lane which is next to the directly adjacent lane of the host vehicle is free and consequently, it is possible to change lane for the host vehicle.
2. The lane is about to become free which means that in the near future a gap on this lane will be available that may be used by the target vehicle so that the neighboring lane of the host vehicle will be free then.

The use of all the prediction results that are given as examples above will be explained later with respect to typical traffic situations that will be described with respect to FIGS. 4 and 5.

In addition to calculating a prediction result for a future movement behavior of at least one target vehicle, the system 1 determines whether a sufficiently large gap on a neighboring lane of the host vehicle exists. If a gap is sufficiently large can be estimated based on size and position of the gap, TTC (time-to-collision) to other vehicles and time gap to other vehicles. This is performed in the risk estimation unit 6. An output of the risk estimation unit 6 is submitted to the action selection unit 7 and comprises information whether a lane change of the host vehicle from its current lane to the neighboring lane may be performed at the moment. Besides information about the current availability of a sufficiently large gap on the neighboring lane, it can also be taken into consideration whether there is a sufficiently large gap in the near future or whether there is a gap which is offset in the longitudinal direction of traveling having approximately the same speed as the host vehicle so that acceleration or deceleration of the host vehicle might lead to the situation where a lane change is possible because the gap then would be besides the host vehicle.

In the action selection unit 7 the output of the prediction unit 5 and the output of the risk estimation unit 6 are combined in order to generate a common recommendation information signal. The recommendation information signal contains information about the feasibility of a lane change. The lane change is considered feasible if it is determined that a change of the host vehicle to a particular neighboring lane would be an appropriate measure for the developing traffic situation. This means that assumed the host vehicle could use a neighboring lane for traveling at an intended speed, for example the set speed of a cruise control the neighboring lane fits better than the current lane. Based on this recommendation information signal, a notification of the driver of the host vehicle can be output. Such output may be information that a lane change is recommendable or a warning that a lane change is currently not possible. But on the basis of such recommendation information signal it is not only possible to inform or warn the driver, but it is also possible to autonomously change the current driving condition of the host vehicle. Thus, an acceleration of the host vehicle may be performed as well as a deceleration or braking of the vehicle. The different actions that can be taken will be described later with respect to the examples of traffic situations. Furthermore, even the entire lane change may be performed autonomously or be prevented actively on the basis of the recommendation information signal. In order to perform such adaptation of the driving condition of the host vehicle, a signal is generated on the basis of the recommendation information signal that is suitable for controlling the controls of the vehicle, for example the motor management in order to generate an acceleration or to control the brake system or to control an electric power steering in order to autonomously conduct the lane change.

Figure 2:
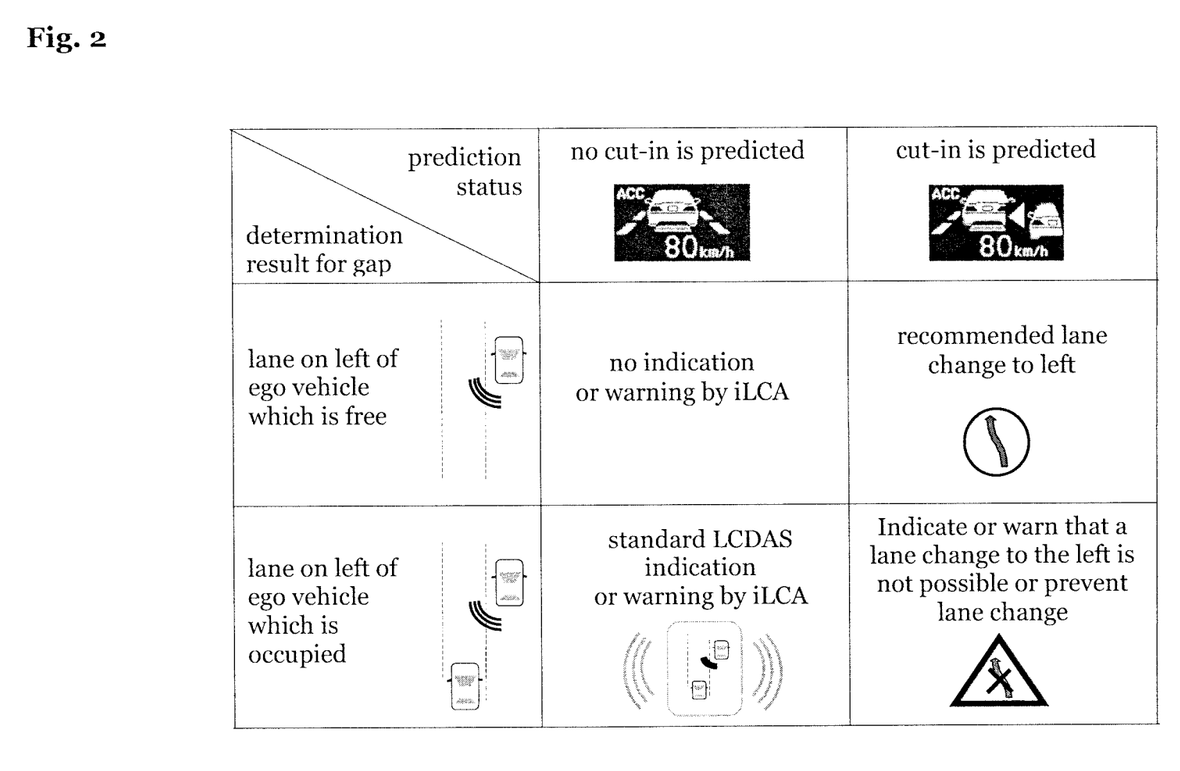
FIG. 2 shows examples for the combination of a predicted future movement behavior of a target vehicle with the result of determination about existence of a gap on a neighboring lane.

In FIG. 2 there is given an overview over the combination of two different prediction result examples with the result of the risk estimation unit 6 in which the determination of the existence of a gap on a neighboring lane is performed. Of course this is only an example for prediction of a cut-in from a right neighboring lane in a right-hand driving traffic system with prioritization of right lanes.

Figure 4A:
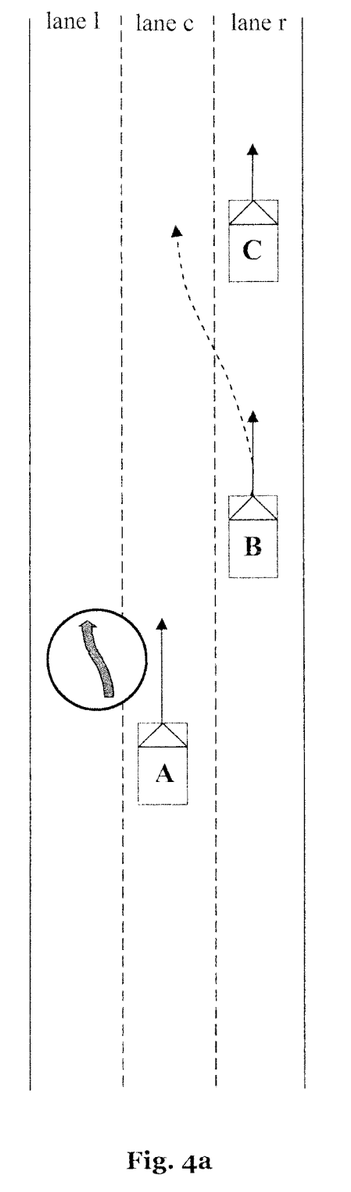
FIG. 4a shows a schematic for explaining the functioning of the inventive method and system.
Figure 4B:
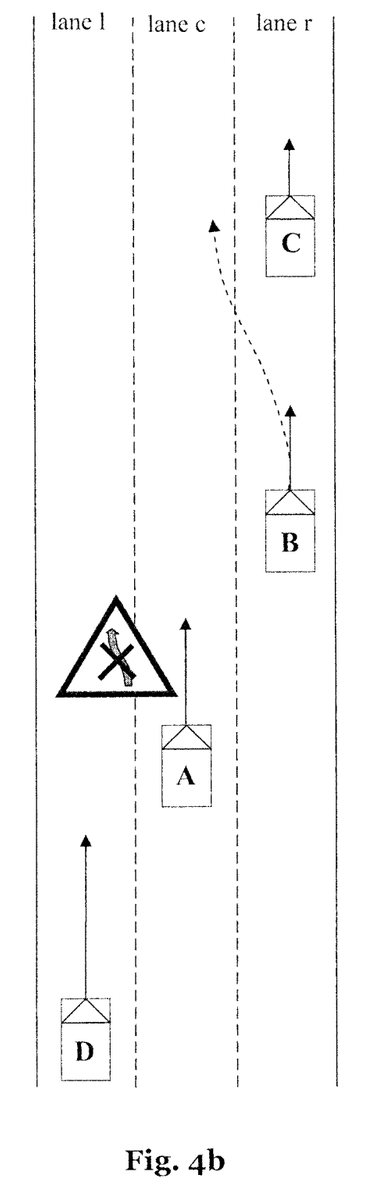
FIG. 4b shows a schematic for explaining a functioning of the inventive method and system in a second traffic situation.
Figure 5:
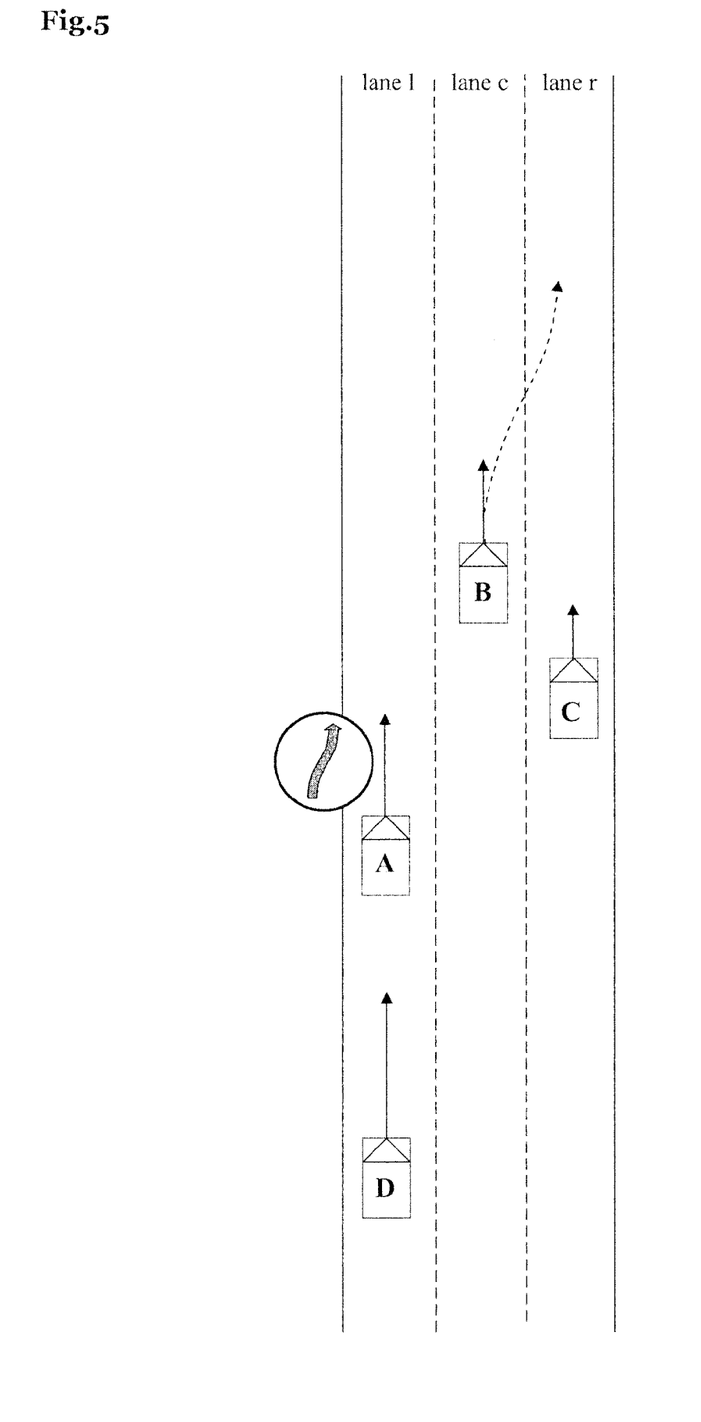
FIG. 5 shows a schematic for explaining functioning of the inventive method and system in a third traffic situation example.

In the table of FIG. 2, the information included in the recommendation information signal generated by the system is explained with respect to traffic situations that are shown in FIG. 4a and FIG. 4b. In FIG. 4a and FIG. 4b there is illustrated a three-lane road with the host vehicle being vehicle A. On the neighboring lane on the right side there are two vehicles B and C that are sensed by the sensor 2 (3, 4 . . . ) and for vehicle B being the target vehicle the future movement behavior is predicted. The result of such prediction may be that no cut-in is predicted as indicated in the middle column of the table of FIG. 2 or that a cut-in will be performed by vehicle B as mentioned in the right column of FIG. 2.

In addition, it is determined whether on the neighboring lane on the left side of vehicle A there is a gap into which the host vehicle A could evade. The result of such determination is given in the left column of FIG. 2 and may be that the lane on the left side of the host vehicle is already free or that, at that point in time, the lane is occupied.

The overall output of the entire system 1 in case that no cut-in of vehicle B is predicted and that the left lane is free does not lead to any presentation or notification to the driver of the host vehicle. This may be the case when for example the distance between vehicles B and C still is rather large or the speed difference rather small.

In the case that no cut-in is predicted and for the neighboring lane on the left side of the host vehicle it is determined that this lane is occupied a notification to the driver is given as in known blind spot warning systems or lane change decision aid systems (LCDAS). This can be a simple information that the lane is currently occupied or the warning in case that an intention of the host vehicle driver to change the lane can be recognized, for example if the driver switches on the turn lights. Alternatively or additionally such information can also be transmitted to the host vehicle by car-to-car communication (C2C).

If on the other hand the cut-in is predicted for the target vehicle the inventive system (intelligent lane change assistance: iLCA) will notify the driver that a change of the lane is recommended even if the host vehicle driver does not (yet) intend to change the lane. Notification is thus not activated only by a driver's action as in known systems but already upon prediction of target object behavior that makes a lane change of the host vehicle seem advantageous. Of course, such actively given recommendation for a lane change is given only in case that in fact the neighboring lane would fit better to the developing traffic situation. For example if the speed of the target object which cuts in would not affect at all the driving condition of the host vehicle no such recommendation needs to be given. If the vehicle that cuts in is slower than the host vehicle and thus reduction of the speed of the host vehicle would be needed of course a free fast lane would fit better to the current driving condition of the host vehicle. In that case a recommendation symbol is displayed as depicted in FIG. 2.

If such lane change would be recommendable but the new lane is occupied at the moment a warning is given to the driver of the host vehicle. This again can be a symbol which is displayed or a symbol in combination with an acoustic warning, an acoustic warning alone or a haptic warning like vibration or steering wheel force, or any combination thereof.

As it has been explained above the central aspect of the present invention is that with the invention a vehicle driver is not informed only if the driver's intention to change lane can be recognized but even at an earlier point in time. This is achieved by using an evaluation of the traffic situation by use of the context-based prediction. Such context-based prediction predicts a possible future behavior of at least one other traffic participant and thus even before the other traffic participant started a particular behavior a reaction of the lane change assistant can be taken. Details and mathematical background of the context-based prediction, the physical prediction and the prediction of a future movement behavior in general is given at the end of the description. For the functioning of the lane change assistant according to the invention it is sufficient that such prediction is made and based on the prediction result the inventive method and system delivers different recommendations or output signals for autonomous driving condition adaptation. Using such prediction result to activate an output in form of a notification of the driver has the advantage that a positive recommendation that can motivate a driver to change the lane can be given.

For a better understanding of the invention now the principles of the prediction of future movement behaviors will be explained with respect to FIG. 3.

Figure 3:
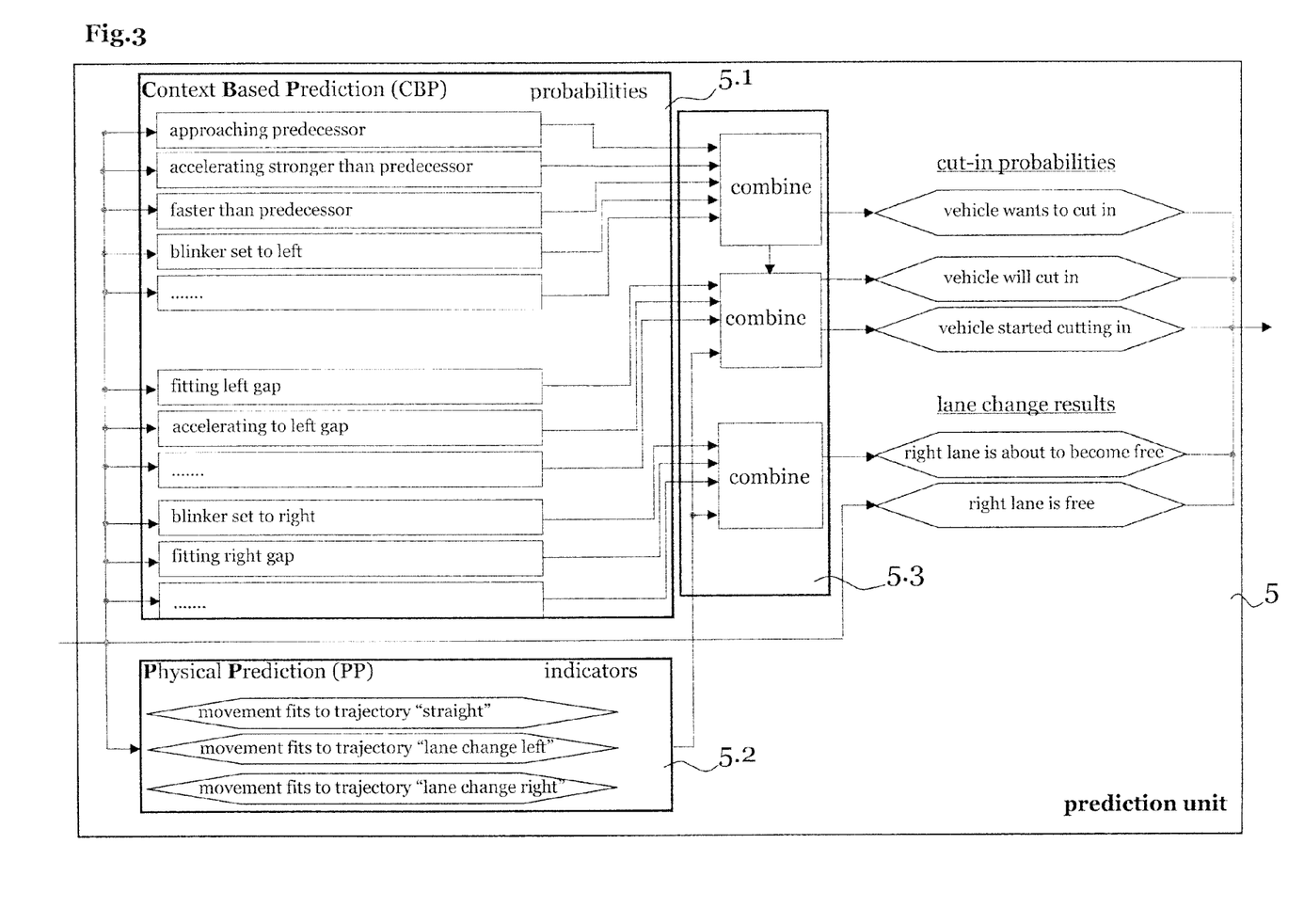
FIG. 3 is schematic for explaining the method for generating a prediction for a future movement behavior of a target vehicle.

In FIG. 3 a block diagram of the prediction unit 5 of FIG. 1 is shown. The context-based prediction unit 5.1 and the physical prediction unit 5.2 are supplied with information analyzed from the sensor data which give for each sensed traffic object and in particular the target object information about current position relative to the host vehicle and thus relative to each other and current speed. Thus, in the context prediction unit 5.1 it can be analyzed whether a target vehicle is approaching its predecessor, whether the target vehicle accelerates stronger than the predecessor, whether the target vehicle is already faster than the predecessor or has set its turning lights to the left. The combination of a plurality of these indicators which of course can comprise additional indicators which are not mentioned here, it can be estimated if a vehicle probably wants to cut in. Thus, one possible output of the prediction unit 5 is that with low probability it is predicted that the vehicle will cut in and thereby change to the lane of the host vehicle. It is to be noted that this pure intention to cut in takes into consideration only those aspects of the traffic situation that might lead to a decision of the driver to change the lane. For example, for this low probability prediction it is not taken in to consideration that actually the intended lane change is in fact possible.

If such additional indicator is taken into consideration the confidence of the prediction result will be higher. For example, in addition to the relationship between the target vehicle and its predecessor it is now also taken into consideration if the intended lane change of the target vehicle actually can be performed. Thus, it is determined if a fitting left gap exists into which the target vehicle could evade or if there is a gap on the left neighboring lane of the target vehicle which is offset in the longitudinal direction that could be for example reached by acceleration of the target vehicle on the current lane. Taking these additional indicators into consideration the prediction result could be that the vehicle will cut in most probably. In FIG. 3 it is illustrated that the additional indicators are combined in a separate step and then the combination result of the low probability evaluation is combined with them. Of course, this could be performed also in a single step in the prediction unit 5.3.

Examples for a third group of indicators are given which are necessary to evaluate a different traffic situation. In that traffic situation it is predicted if a target vehicle leaves the lane directly adjacent to the current lane of the host vehicle in order to change from a center lane to a right lane assumed that the host vehicle is driving on the left lane. In order to evaluate such traffic situations for example an indicator is used whether the turning lights to the direction of the right lane is set in the target vehicle and/or if there is a fitting e gap on the right lane. Again these indicators are combined to predict if the lane directly adjacent to the current lane of the host vehicle it about to become free. It is to be noted that for the explained example again a right-hand driving traffic system with right lane prioritization is used without limitation of generality.

Of course, the lane directly adjacent to the current lane of the host vehicle could already be free. In that case no prediction is necessary in its literal sense but the output of the prediction unit 5 as a prediction result will be that the right lane is free. This output can be generated directly on the basis of the supplied information derived from the sensor data.

In addition to the context-based prediction a physical prediction is performed in the physical prediction section 5.2 using also a plurality of indicators. A first example for such indicator is that the movement fits to trajectory "straight", a second example that the movement fits to trajectory "lane change left" and the third example is that the movement fits to trajectory "lane change right". These indicators are generated in the physical prediction section 5.2 and are then combined with the indicators of the context-based prediction section 5.1. By doing so it is, for example, possible to verify that the vehicle in fact cuts in. Thus, if the indicators show that in fact the movement of the target vehicle fits to trajectory "lane change left" it can be confirmed that the vehicle will cut in and thus, a prediction result that the vehicle already started cutting in, can be output which means a cut-in has highest probability.

The output of the prediction unit 5 is then fed to the action selection unit 7.

Two traffic situations which are closely related are now described with reference to FIGS. 4a and 4b. Thus, it will at first be explained with respect to FIG. 4a and then the differences will be explained with reference to FIG. 4b.

In FIG. 4a there is a three-lane road in a right-hand driving traffic system with prioritization of the right lane. The host vehicle that is equipped with the inventive system is vehicle A and is driving on the center lane c at a speed which is indicated by the length of the arrow. The speed is for example maintained by an intelligent adaptive cruise control (iACC) so that an adaptation to a slower predecessor will be performed autonomously taking into consideration a set target distance to the host vehicle's predecessor. In the present case, since there is no predecessor at the moment, vehicle A will travel at the set speed.

On the right lane r two vehicles are sensed by at least one of sensors 2, 3, 4, . . . of host vehicle A. In order to do so it is preferred that a lane detection system is mounted on vehicle A. Such lane detection system may also identify lanes if there are no lane markings due to for example a plurality of vehicle trajectories which are stored and analyzed so that lanes can be identified even without lane markings.

The speed of vehicle B which is the target vehicle in the current case and also the speed of vehicle C are determined. By determining the speed it can be recognized that the speed which is also indicated by the length of the arrows of vehicle B and C that vehicle B drives faster than vehicle C. Thus, the distance between vehicle B and vehicle C is reduced and vehicle B approaches vehicle C. Since the host vehicle A at the moment does not block vehicle B it can be predicted from the indicators that it is likely that vehicle B follows the trajectory indicated by the dashed arrow. In such a situation the prediction unit 5 predicts the cut-in of vehicle B. Thus, some reaction of the vehicle A is necessary, because vehicle A drives faster than vehicle B. If no autonomous reaction of vehicle A shall be performed but a recommendation for selecting the correct lane shall be given by the inventive system and method a symbol as shown in FIG. 4b next to the host vehicle will be displayed on the dashboard or head-up-display of vehicle A recommending to the driver that a lane change from center lane c to left lane 1 should be performed. If the driver follows the recommendation it could maybe avoided to adapt the speed of vehicle A to slower driving of vehicle B and so the set speed will be maintained.

Of course in addition an adaptation of the speed of vehicle A could be performed. This may depend on the speed difference between vehicle A and vehicle B as well as on the distance in the longitudinal direction. If the speed difference is relatively large and furthermore vehicle A is already close to vehicle B, reduction of the speed of vehicle A maybe advantageous in order to avoid a harsh maneuver to be necessary when changing from lane c to lane 1.

It is to be noted that it is preferred that in case the system comes to the result that a lane change is recommendable the target distance between the host vehicle and its predecessor that is set in the adaptive cruise control is automatically set to the smallest possible value in order to avoid unnecessary reduction of speed while the lane change from lane c to lane 1 is performed. Alternatively the adaptive cruise control allows to approach the preceding vehicle up to a predetermined minimum value, for example the minimum legal safety margin.

The situation is of course different in case that another traffic participant is approaching from behind on left lane 1. Even if vehicle D in the illustrated case is not yet besides vehicle A it can be determined that there is no fitting gap on lane 1 available. Because of the higher speed of vehicle D, vehicle D will approach vehicle A too fast to allow a save lane change from lane c to lane 1 without forcing vehicle D to brake strongly. Approaching vehicle D is the only difference between the situation of FIG. 4a and FIG. 4b. Thus, again it is predicted that target vehicle B will change lane and thus cut in for certain relations of speeds and distances of/between the vehicles. Nevertheless the lane change cannot be recommended of course because a collision between host vehicle A and vehicle D maybe the result. Thus, a warning symbol as depicted in FIG. 4b is displayed on the dashboard or head-up-display of the host vehicle A. In addition the system of host vehicle A will decelerate based on an estimated time-to-collision with vehicle B. The time-to-collision is calculated on the basis of the speed of vehicle A and vehicle B which is predicted to cut in. Such adaptation of the speed or even an emergency breaking can be performed independently of an activated adaptive cruise control. Thus, it is preferred that the lane change assistance system according to the invention is connected to the controls of the host vehicle so that the system is capable of controlling the speed.

As it has been mentioned earlier signals for controlling the host vehicle are generated preferably that also control the power steering of the host vehicle. On the one side in the situation of FIG. 4a this could mean that an autonomous lane change from lane c to lane 1 is performed without any input from the driver's side. To the contrary in FIG. 4b such lane change is actively inhibited for example by generating a torque on the steering wheel that counter acts a turning movement for a lane change initiated by the driver of the host vehicle. Of course such autonomous actions of the vehicle may be overruled at any time based on the intention of the driver. This means that in case that the driver exerts a relatively high force it will be possible to turn the steering wheel nevertheless.

A different traffic situation will now be described with reference to FIG. 5. Again there is shown a three-lane road in a right-hand driving traffic system with a prioritization of right lane r. The host vehicle A is travelling on left lane 1 because both lanes c, r are occupied with vehicles B and C. While vehicle B currently is driving faster than vehicle C vehicle B occupies center lane c due to the process of overtaking vehicle C. The inventive system A makes a prediction that vehicle B will change to the right lane r. The prediction is based on observing that the right lane r is free or is about to become free so that vehicle B although maintaining its current speed can easily change to lane r. Of course, indicators like turning lights or information directly received by car-to-car communication can also be taken into consideration.

In case of prioritization of the right lanes over left lane 1 a recommendation to change the lane to the right neighboring lane of host vehicle A is given at any time that the right neighboring lane is determined to be free currently or that it will be free in the near future and that the set speed of a cruise control or the current speed in case no cruise control is activated can be maintained after the lane change. Thus, in the present case it would be recommended that the driver of vehicle A shall change to center lane c because while approaching vehicle B the target vehicle B will already leave lane c.

According to a preferred embodiment such recommendation to change to a prioritized lane can be limited to situations where it is detected by the host vehicle that a successor is approaching from behind. Such approach can relatively easy be sensed by the sensors that are also used for determining if the neighboring lane is free. Depending on the range of such sensors it might be necessary to provide a separate sensor or to use another sensor of vehicle A to detect if vehicle D is approaching the host vehicle and to determine information about the speed difference.

Based on such speed difference between approaching vehicle D and host vehicle A and the speed difference between host vehicle A and target vehicle B even a lane change from lane 1 to lane c be recommended in the case that it can be calculated that the host vehicle A can change back to lane 1 again after vehicle D has passed. Such a recommendation can be based on a first time-to-collision value that is calculated for vehicles A and D and a second time-to-collision value which is calculated on the basis of the determined speeds of vehicle A and vehicle B.

As it has been mentioned above the examples that are given have been made with respect to a right-hand driving system with a prioritization of the right lanes. It is evident that this may be adapted to a left-hand driving system and/or prioritization of the left lane. But even when there is no prioritization of any lanes the examples for the method and system may be adapted accordingly. In that case a lane that fits to the current speed of a vehicle better than the current lane is set as lane to which a vehicle may probably change. This could be done individually for the host vehicle A and the target objects. In that case it would, coming back to the situation shown in FIG. 5, even be possible to predict that vehicle B will change to lane 1 if this is currently a lane with slower traffic than lane c and that vehicle A is recommended to change to lane c which now has become free and where driving with the set speed of vehicle A seems to be appropriate.

For a more detailed understanding of the future movement behavior prediction definitions and further explanations will be given.

Definitions

Host vehicle: A host vehicle is a vehicle in a traffic situation which has the lane change assistance system according to the invention mounted thereon and which is equipped with the sensors and a computing system that allows the computation of a likely future behavior of other traffic vehicles and to detect presence of lanes and objects on these lanes.

Sensor: A sensor may be any means that can deliver information suitable for describing a traffic scene at a point in time. Such sensors may be cameras, radar, lidar or the like.

Target object (target vehicle): A target object or vehicle is an object or vehicle being observed by generating information by at least one sensor and for which a future behavior shall be estimated.

$x_i^t$: traffic object i at time t with $x_i^t = (p_{i,x}^t, p_{i,z}^t, v_{i,x}^t, v_{i,z}^t, a_{i,x}^t, a_{i,z}^t)^T$, $p_{i,x}^t$, $p_{i,z}^t$ being the lateral and longitudinal position, $v_{i,x}^t$, $v_{i,z}^t$ being the lateral and longitudinal velocity, and $a_{i,x}^t$, $a_{i,z}^t$ being the longitudinal and lateral acceleration of traffic object i at time t.

$S^t$: scene at time t, consisting of all perceived traffic objects and road environment (lanes, lane-markings, traffic signs, traffic-lights, etc.) at time t.

B={b}: set of behaviors a traffic object ("participant") can perform. In the following $b_i^t \in B$ will be used to denote the behavior traffic participant $x_i^t$ is performing at time t.

Indicators:

We define indicators $$I = \bigcup_j \tau_j(\cdot)$$

as a set of functions $$\tau_j(x^t, S^t) = (v_j^t, c_j^t) \qquad (1)$$

where $v_j^t$ is measurable variable conveying information about the future or ongoing behavior of a target vehicle at time t and $c_j^t$ a confidence about the true-state of the variable $v_j^t$. The confidence $c_j^t$ is obtained by combining the sensor-confidence of all elements of $S^t$, which have been evaluated for the computation of $v_j^t$, where the sensor confidence is a value for the reliability of the sensed information. Without loss of generality indicators can be defined such that $v_j^t \in [0,1]$, which means the values are normalized between 0 and 1 for example by means of a Fermi-function. Such a normalization is useful for the combination of indicators as described below.

It is differentiated between direct and indirect indicators.

Direct Indicators $I_D \subset I$:

Direct indicators provide variables, which are observable if and only if the behavior to be detected has started. For example for predicting a lane change, direct indicators are lateral velocity, lateral position relative to the lane, changing orientation relative to the lane, or changing orientation relative to other traffic participants.

Orientations as such are always observable, but the change of orientation can only be observed when the vehicle is changing lanes, because then it is rotating around the yaw-axis. A position change is detected, because the lateral velocity is the change of lateral position over time.

Indirect Indicators $I_1 \subset I$:

Indirect indicators provide variables, which are already observable before the predicted behavior starts. We define indirect indicators as the set of all possible indicators without the set of direct indicators:

$$I_1 = I \setminus I_D \qquad (2)$$

There are two types of indirect indicators:
1. The first type of indirect indicators relates to information about a relation between at least one traffic participant as target vehicle and one or more other traffic participants or static scene elements.

A plurality of examples of traffic situations has been explained above. These examples are mostly made for right-hand driving and prioritization of the right lane. Of course for any example or aspect that is mentioned an adaptation for left-hand driving and for left-lane prioritization or no prioritization as in the US may be made. The indicators given below would then need to be adapted accordingly.

fitting-left-gap: $\tau_{fitting-left-gap}(x_i^t, S^t)$ provides a value $v_{fitting-left-gap} \approx 1$ if a gap fitting to $x_i^t$'s position, velocity, and length is now or soon available on the left lane. Let $x_{lp}^t$ depict the predecessor of $x_i^t$ on the left neighboring lane of $x_i^t$, and let $x_{ls}^t$ depict the successor of $x_i^t$ on the left neighboring lane of $x_i^t$. Then a gap is defined by a frontal position, a rear position, a frontal velocity, and a rear velocity. The frontal position and frontal velocity equal those of $x_{lp}^t$, the rear velocity equals that of $x_{ls}^t$. The rear position equals that of $x_{ls}^t$, plus the length of $x_{ls}^t$ and a speed-dependent safety margin. If $x_{lp}^t \notin S^t$, i.e. $x_i^t$ has no left predecessor, then the frontal position and velocity are set to infinity. If $x_{ls}^t \notin S^t$, i.e. $x_i^t$ has no left successor, then the rear position and velocity are set to zero. The fitting of a gap g to a vehicle $x_i^t$ can be determined by multiple factors:

The ratio of the length of $x_i^t$ and the gap size, the longitudinal TTC of $x_i^t$ with the gap's frontal border, defined as the longitudinal TTC between $x_i^t$ and $x_{lp}^t$, with the longitudinal TTC defined as $$ttc_z(x_i^t, x_j^t) = (p_{i,z}^t - p_{j,z}^t)(v_{j,z}^t - v_{i,z}^t) \qquad (3)$$

the longitudinal TTC of with the gap's rear border, and the time when the gap is available, the so called "Time To Gap" (TTG). If $x_i^t$ is behind the gap g, then the TTG equals the longitudinal TTC to the gaps rear border. If $x_i^t$ is ahead of g, the TTG equals the longitudinal TTC to the frontal gap border. If the gap is available now, then the TTG equals zero.

fitting-right-gap: In analogy $\tau_{fitting-right-gap}(x_i^t, S^t)$ provides a value $v_{fitting-right-gap}^t \approx 1$ if a fitting gap is available on the right neighboring lane of $x_i^t$. Here the gap is defined by the predecessor $x_{rp}^t$ and successor $x_{rs}^t$ on the right lane.

approaching-predecessor: The indicator $\tau_{approaching-predecessor}(x_i^t, S^t)$ provides a value $v_{approaching-predecessor}^t \approx 1$ if $x_i^t$ is approaching a nearby predecessor on its own lane. This is derived from the longitudinal TTC between $x_i^t$ and its predecessor.

fitting-left-lane: $\tau_{fitting-current-lane}^t(x_i^t, S^t)$ creates a value $v_{fitting-left-lane} \approx 1$ if the lane left of $x_i^t$ fits well to $x_i^t$'s driving. This is computed by the TTC between $x_i^t$ and its predecessor on the left lane and/or by comparing the current speed of $x_i^t$ with the average speed driven on the left lane.

fitting-current-lane: $\tau_{fitting-current-lane}^t(x_i^t, S^t)$ creates a value $v_{fitting-current-lane}^t \approx 1$ if the lane of $x_i^t$ fits well to $x_i^t$'s driving. This is computed by the TTC between $x_i^t$ and its predecessor and/or by comparing the current speed of $x_i^t$ with the average speed driven on $x_i^t$'s lane.

fitting-right-lane: $\tau_{fitting-right-lane}^t(x_i^t, S^t)$ creates a value $v_{fitting-right-lane} \approx 1$ if the lane right of $x_i^t$ fits well to $x_i^t$'s driving. This is computed by the TTC between $x_i^t$ and its predecessor on the right lane and/or by comparing the current speed of $x_i^t$ with the average speed driven on the right lane.

tailgating: $\tau_{tailgating}(x_i^t, S^t)$ creates a value $v_{tailgating}^t \approx 1$ if is tailgating its predecessor on its own lane. This is computed by the ratio of the longitudinal distance between $x_i^t$ and its predecessor, divided by the velocity-depended safety distance.

evade-to-gap: $\tau_{evade-to-gap}(x_i^t, S^t)$ creates a value $v_{evade-to-gap} \approx 1$ if $x_i^t$ is approaching its predecessor on its own lane and if a fitting gap is or will be available before $x_i^t$ collides with its predecessor. This is computed by the difference between the longitudinal TTC and TTG, in combination with the indicators $\tau_{approaching-predecessor}(\cdot)$ and $\tau_{fitting-left-gap}(\cdot)$ where (.) is a placeholder for an arbitrary argument.

accelerate-to-gap: $\tau_{accelerate\text{-}to\text{-}gap}(x_i^t, S^t)$ creates a value $v_{accelerate\text{-}to\text{-}gap}^t \approx 1$ if $x_i^t$ is accelerating (or decelerating/breaking), and if this acceleration is necessary to better fit to a gap's position or velocity (which means the gap is moving due to the movement of the predecessor and successor on the left or right neighboring lane with their velocity). This is evaluated by computing the TTC considering the gap's and the $x_i^t$'s acceleration and combining the results with the above indicator.

accelerate-despite-ttc: $\tau_{accelerate\text{-}despite\text{-}ttc}(x_i^t, S^t)$ creates a value $v_{accelerate\text{-}despite\text{-}ttc}^t \approx 1$ if $x_i^t$ is accelerating faster than its predecessor, and if the TTC between the two is low.

lane markings: This group of indicators produce values $v_{lane\text{-}markings}^t \approx 1$ if $x_i^t$ has to adapt its behavior to comply with the lane markings. E.g. a line-end indicator could produce a high value if $x_i^t$ is driving on a lane, which is about to end. Or a dashed-line indicator could produce a low value if $x_i^t$ is driving on a lane which does not permit lane changes.

combinations of the above: The indicators above can be recombined to create new indicators. E.g. $\tau_{fitting\text{-}left\text{-}gap}(\bullet)$ can be combined with $\tau_{approaching\text{-}predecessor}(\bullet)$ to an indicator which gives a high value if a gap is available and $x_i^t$ is approaching $x_p^t$. The combination is done in a way that a high value of one of the indicators can compensate for a medium value of the other indicator. This is achieved by a weighted summation of the two values:

$$v_{combined} = \min\{1, w_1 v_{fitting\text{-}left\text{-}gap} + w_2 v_{approaching\text{-}predecessor}\} \text{ with} \sum_i w_i > 1.$$

2. The second type of indirect indicators conveys information about the driver intention, actively communicated by the traffic participant whose behavior is to be predicted.

Examples are:

turning-signal: This indicator produces a high value if the target vehicle's turning signal is activated.

breaking-light: This indicator produces a high value if the target vehicle's breaking light is activated.

car-to-car-communication: This group of indicators can respond to communicated changes of the sending vehicle's velocity, heading or turning signal activation.

As an alternative to the described indicators one could also use indicators which are not normalized to [0,1]. In particular, threshold values could be defined indicating whether an indicator is present or not. Therefore, when a threshold is exceeded, the respective indicator is deemed to be present.

Context-Based Prediction

Context-based prediction consists of a set of classifiers $\Gamma^b = \{\gamma_j^b\}_{j=1 \ldots N_t}$ where each classifier $\gamma_j^b$ estimates a probability $p(b_i^{t+\Delta t}|x_i^t, S^t, \gamma_j^b)$ that a target vehicle $x_i^t$ will execute behavior $b \in B$ at a time $t+\Delta t$. For each behavior $b$ a different set of classifiers can be used.

Here, $B = \{\text{lane-change-left, lane-change-right, follow-lane}\}$. A feature vector $f_{ji}^{bt}$ is computed for each $x_i^t$ and each classifier $\gamma_j^b$ based on the indirect indicators, where $$f_{ji}^{bt} = (f_{ji1}^{bt}, \ldots, f_{jiN_j}^{bt})^T \quad (4)$$

$$f_{jik}^{bt} = \tau_k(x_i^t, S^t), \quad (5)$$

with $\tau_k(\bullet) \in I_j^{\subset I_I}$ (6)

The probability of $x_i^t$ performing behavior $b$ at time $t+\Delta t$ is the estimate:

$$p(b_i^{t+\Delta t}|x_i^t, S^t) \propto \sum_{j=1}^{N_b} \omega_j p(b_i^{t+\Delta t}|x_i^t, S^t, \gamma_j^b) \quad (7)$$

$$p(b_i^{t+\Delta t}|x_i^t, S^t, \gamma_j^b) = \gamma_j^b(f_{ji}^{bt}) \quad (8)$$

That means, for each behavior, the probability is estimated by a weighted combination of a set of multiple classifiers, each using a different set of indicators.

To allow for early prediction before the start of the behavior, no direct indicators need to be used.

In consequence the context-based prediction is capable of determining the class of the future behavior, but not the concrete execution in terms of time and space of the movement of $x_i^t$. In other words, the context-based prediction can estimate the probability of each behavior $b \in B$ to happen roughly at time $t+\Delta t$, but the exact $\Delta t$ and position $p_{i,x}^{t+\Delta t}$, $p_{i,z}^{t+\Delta t}$ at time $t+t$, of $x_i^t$ are unknown.

Additionally or as an alternative to a context-based prediction that does not use any direct indicators as described above, a classifier could be used, which dynamically includes direct and indirect indicators based on the prediction time $\Delta t$. For example, the classifier could use indirect indicators for $\Delta t > 2s$ and could fade to direct indicators for $\Delta t < 1s$.

Different behavior classes require different indicators, dependent on the situation. This is addressed by using at least one situation model per behavior wherein each model contains indicators and trajectory information.

Physical Prediction

Physical prediction compares measured points with trajectories in situation models. It determines a set of potential trajectories for action generation. It also can indicate when the context-based prediction/behavior recognition went wrong (self-validation).

The physical prediction uses a set of predictors $\phi = \{\phi^b\} b \in B$.

$X_i^t = (x_i^{t-T}, \ldots, x_i^t)$ defines the history of the last $T+1$ states of traffic participant $i$.

Let $\mu(p_z, a) = p_x$ be a parametric trajectory model, returning a lateral position $p_x$ given a longitudinal position $p_z$ and a parameter set $\alpha$.

Let $A^b = \{a\}$ be a set of parameters for $\mu$, covering different trajectories for behavior $b$.

The task of a physical predictor $\phi^b(p_{i,x}^{t+\Delta t}, p_{i,z}^{t+\Delta t}, x_i^t, S^t)$ is to estimate the likelihood that $x_i^t$ will be at position $p_{i,x}^{t+\Delta t}$, $p_{i,z}^{t+\Delta t}$ at time $t+\Delta t$, given the history of states $x_i^t$ and the current situation $S^t$, for a behavior $b$. This likelihood is estimated by $$\phi^b(p_{i,x}^{t+\Delta t}, p_{i,z}^{t+\Delta t}, X_i^t, S^t) = v^b(p_{i,x}^{t+\Delta t}, p_{i,z}^{t+\Delta t}, X_i^t, S^t) p(b_i^{t+\Delta t}|x_i^t, S^t) \quad (9)$$

$v^b(\bullet)$ is a so-called validator function. It has the important property, that it returns value $\approx 1$ if it has no evidence indicating that $x_i^t$ will not be at point $(p_{i,x}^{t+\Delta t}, p_{i,z}^{t+\Delta t})$ at time $t+\Delta t$. Only if it has evidence indicating that $x_i^t$ will not be at that point does it return a value lower than 1. Consequently, the physical predictor $\phi^b(\bullet)$ relies on the context-based prediction to predict if $x_i^t$ will perform behavior $b_i^{t+\Delta t}$, it only restricts the space, that is, the way how $x_i^t$ will perform this behavior.

The validator function validates the evidence by $$v^b(p_x, p_z, X_i^t, S^t) = \sum_{a \in A^b} \lambda_p(p_x, p_z, a)\lambda_h(X_i^t, a)\lambda_s(S^t, a) \quad (10)$$

$\lambda_p(p_x, p_z, a)$ estimates the likelihood for the point $(p_x, p_z)$ to lie on a trajectory modeled with parameter a. This is computed as:

$$\lambda_p(p_x, p_z, a) = \begin{cases} 1 & \text{if } p_x = \mu(p_z, a) \\ 0 & \text{otherwise} \end{cases} \quad (11)$$

$\lambda_h(X_i^t, a)$ computes the likelihood for the history $x_i^t$ to originate from a trajectory modeled with parameter a. This is estimated by $$\lambda_h(X_i^t, a) = \exp\left(-\frac{1}{2\sigma^2(T+1)^2}\sum_{\tau=0}^{T}(p_x^{t-\tau} - \mu^b(p_z^{t-\tau}, a))^2\right) \quad (12)$$

$\lambda_s(S^t, a)$ computes the likelihood for the trajectory modeled with parameter α to comply with the current situation. This is based on statistics of how traffic participants conduct a specific behavior dependent on the other traffic participants behavior. Those parameters resulting in trajectories which lead to a high TTC to other traffic participants are favored over those, with a low TTC.

As an alternative to the equation (12) for computing the difference between the model and the measured positions, any other metric could be used.

Also, as an alternative to the parametric trajectory model μ of the physical prediction, a model-free approach could be chosen, for example potential fields.

Here, $\mu^b$ is the tan h-function and a $=(S_x, S_z, d_x, d_z)$, where $S_x$, $S_z$ are lateral and longitudinal stretching factors, and $d_x$, $d_z$ are lateral and longitudinal offset-factors, such that $$p_x = \mu^b(p_z, a) \quad (13)$$

$$\Leftrightarrow p_x = s_x \cdot \tan h(s_z \cdot (p_z - d_z)\pi) + d_x \quad (14)$$

Only the parameter $S_x$, accounting for the average lateral traveling distance while making a lane change, depends on the behavior b. For b="lane-change-left", $s_x = -0.5$ w, where w is the lane width. For b="lane-change-right", $s_x = 0.5$ w, and for b="follow-lane", $s_x = 0$. $s_z$ is set to a constant value using expert knowledge and accounts for the average longitudinal traveling distance while making a lane change. $d_x$ is averaged from the last T lateral positions and is constant for all b∈B. $d_z$ is sampled equidistantly, which means $d_2$ is chosen from a set $(-M \cdot \Delta d_z, \ldots, \Delta d_z, 0; \Delta d_z, \ldots, N \cdot \Delta d_z)$.

Consequently, in equation (10) for the computation of the validator function only the different longitudinal offsets need to be sampled.

For further aspects related to the prediction of future movement behavior, in particular a mismatch detection in case of a wrong prediction in the context-based prediction reference is made explicitly to EP 2 562 060 A1.

The invention claimed is:

1. A method for assisting a driver of a host vehicle in potential lane change situations, comprising the steps of:
   producing sensor data by at least one sensor physically sensing the environment of the host vehicle,
   predicting, based on the produced sensor data, future movement behavior of at last one sensed vehicle before the start of the movement behavior of said at least one sensed vehicle, wherein it is predicted whether or not said at least one sensed vehicle will perform a lane change,
   determining whether a gap on a neighboring lane of the host vehicle exists,
   generating, if the neighboring lane of the host vehicle would fit better for the predicted future movement behavior, a recommendation information signal regarding feasibility of a lane change of the host vehicle to this better fitting lane, the feasibility being determined by computationally combining the determination result of the existence of a gap and the predicted future movement behavior, and
   at least one of outputting a notification for the host vehicle's driver and, in case that a lane change is feasible, generating signals for performing an autonomous lane change on the basis of the recommendation information signal by the host vehicle.

2. The method according to claim 1, wherein
   an adaptation of the host vehicle's speed is performed autonomously when the predicted future movement behavior would reduce safety distance between the host vehicle and said at least one sensed vehicle for which future movement behavior is predicted.

3. The method according to claim 1, wherein
   the existence of a gap on the better fitting neighboring lane is predicted for the future and an adaptation of the host vehicle's speed is performed autonomously to enable changing lane into the gap when it becomes available.

4. The method according to claim 1, wherein
   for outputting the notification a symbol is displayed.

5. The method according to claim 1, wherein
   for outputting the notification an acoustic and/or haptic signal is outputted.

6. The method according to claim 1, wherein
   in case the predicted behavior is a cut-in of said at least one sensed vehicle from any neighboring lane onto the lane on which the host vehicle currently drives or the predicted behavior is braking and existence of a gap on the better fitting neighboring lane is determined a notification recommending lane change to the better fitting lane is output and/or lane change is autonomously performed.

7. The method according to claim 1, wherein
   said at least one sensed vehicle is a preceding vehicle and in case the predicted behavior is the lane change of said at least one sensed vehicle as the preceding vehicle from a neighboring lane to a lane next to a neighboring lane and existence of a gap on this neighboring lane which is also the better fitting lane is determined a notification recommending lane change is output and/or lane change is autonomously performed.

8. The method according to claim 1, wherein
   it is determined that a neighboring lane of the current lane of the host vehicle fits better in case that a successor is approaching on the current lane and no lane change is predicted for the successor or in case the neighboring lane is prioritized or in case a required adaptation of the speed of the host vehicle would be smaller on this neighboring lane than on the current lane.

9. Computer software program product embodied on a non-transitory computer-readable medium, said product performing, when executed on a computer, the method according to claim 1.

* * * * *